United States Patent
Gately

[15] 3,678,370
[45] July 18, 1972

[54] VOLTAGE LIMITING CIRCUIT FOR CONSTANT CURRENT POWER SUPPLIES

[72] Inventor: Joseph R. Gately, Woodside, N.Y.
[73] Assignee: Forbro Design Corp., New York, N.Y.
[22] Filed: Oct. 30, 1970
[21] Appl. No.: 85,416

[52] U.S. Cl. .................. 323/4, 323/9, 323/20, 323/22 T, 323/40
[51] Int. Cl. ............................................. G05f 1/58
[58] Field of Search .................. 323/4, 9, 20, 22 T, 38, 40

[56] References Cited

UNITED STATES PATENTS

| | | | |
|---|---|---|---|
| 3,536,987 | 10/1970 | Muchnick | 323/4 |
| 3,303,411 | 2/1967 | Gately | 323/4 |
| 3,303,412 | 2/1967 | Gately | 323/4 |
| 3,305,764 | 2/1967 | Todd | 323/22 T |
| 3,414,803 | 12/1968 | Glasgow et al | 323/4 |

Primary Examiner—A. D. Pellinen
Attorney—Alfred W. Barber

[57] ABSTRACT

A current regulated power supply employs a current bridge regulating circuit. A voltage limiting circuit is provided using a voltage comparison circuit drawing negligible current so that the current regulation is substantially undisturbed. A back-up current limiter is provided to limit output current in case of malfunction of the main current regulator.

1 Claim, 3 Drawing Figures

PATENTED JUL 18 1972

*INVENTOR.*
JOSEPH R. GATELY

BY

*Alfred W. Barber*
ATTORNEY

INVENTOR.
JOSEPH R. GATELY
BY
Alfred W. Barber
ATTORNEY

VOLTAGE LIMITING CIRCUIT FOR CONSTANT CURRENT POWER SUPPLIES

DESCRIPTION OF THE PRIOR ART

Voltage regulating power supplies are generally provided with current limiting means for limiting the maximum or short-circuit current of the power supply to a safe value. Since the current is generally monitored by means of a current sensing resistor connected inside the voltage control loop, such current limiting is readily accomplished without degradation of the voltage regulating characteristic.

However, voltage limiting of a current regulating power supply, the dual of current limiting of a voltage regulating power supply, cannot be accomplished within the current control loop and hence presents some difficulties. In order for the voltage limiter to be most effective, its sensing terminals must be connected directly across the load to be protected. This imposes two constraints. One, the sensing input must draw substantially no current through the current-sensing resistor, and two, the input to the limiter must be either isolated or able to support a common mode voltage at least as great as the maximum load voltage which is to be permitted.

SUMMARY

In accordance with the present invention an adjustable reference voltage is connected in series bucking with the input to a differential amplifier and the two are connected across the load, the voltage across which is to be limited. The load is supplied with a regulated current from a precision bridge controlled current source. The output of the current control amplifier and the voltage limiting amplifier are connected to an OR gate which in turn is connected to a series pass regulating transistor. During normal current regulating operation, the current control amplifier functions to regulate the load current to a preset value. However, if the load voltage exceeds the preset reference voltage by even a small amount, the voltage limiting amplifier takes over and the load voltage is kept from increasing any further. In the drawing:

Figure 1:
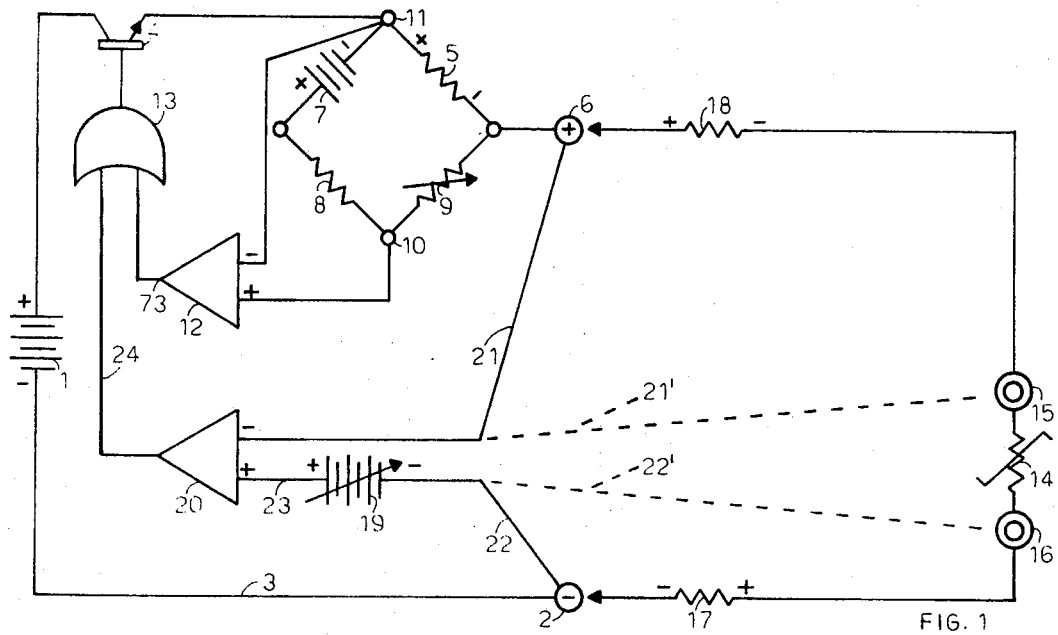
FIG. 1 is a simplified schematic circuit diagram of the present invention.

FIG. 1 is a simplified schematic circuit diagram illustrating the basic concept of the present invention, that of a voltage limiting circuit drawing practically no current for limiting the voltage across the load of a precision current regulator. The basic current regulating circuit comprises a source of voltage illustrated by a suitable battery 1 directly connected to one load terminal 2 over lead 3 and connected through a current control means 4 and current sensing resistor 5 to the other load terminal 6. The current control means 4, for example, may be a suitable power transistor. The current regulating circuit may, for example, comprise a current control bridge circuit including current sensing resistor 5, reference voltage source 7, reference resistor 8 and adjustable current control resistor 9. The bridge balance is sensed by amplifier 12 having its input connected across the bridge diagonal points 10 and 11 and its output 73 connected to OR gate 13. The output of OR gate 13 is connected to the control means of current control means 4. When the bridge is balanced, the voltage drop across reference resistor 8 equals the voltage of reference source 7 and the voltage drop across current sensing resistor 5 due to the flow of current to output terminal 6 equals the voltage drop across current control resistor 9. Since the current $I_b$ through resistor 9 is equal to the reference voltage 7 divided by the reference resistor 8, the voltage across current sensing resistor 5 is $I_b R_9 = (I_o - I_b) R_5$ where $I_o$ is the output current being regulated, $I_b$ is the bridge current, $R_9$ is the resistance of resistor 9 and $R_5$ is the resistance of resistor 5 and thus, $$I_o = I_b \left( \frac{R_9}{R_5} + 1 \right).$$

The phasing of amplifier 12, OR gate 13 and current control means 4 is such that any tendency for the output current to depart from its preset value is countered by a change in current control means 4 to bring the current back to this preset value. Adjustment of current control resistor 9 provides for presetting the output current to any value from substantially zero to the maximum current for which the regulator is designed. An adjustable offset control may be provided on the amplifier 12 (FIG. 3) set at V offset = $I_b \cdot R_5$ allowing operation down to true zero ($I_b << I_o$). With a high gain and stable amplifier 12 and precision and stability in the bridge components precise, stable and wide range current control can be effected.

Now, current will not flow from the output terminals 2 and 6 unless a resistive load such as load resistance 14 having terminals 15 and 16 is connected across output terminals 2 and 6 as by leads assumed to have effective resistances of 17 and 18 respectively. With load resistance 14 thus connected, the present controlled current as described above will flow from the output terminals 2 and 6 through this load provided the regulator is able to supply sufficient voltage across these output terminals. This terminal voltage $RI_o$ (where R is the total series resistance across the load terminals) is sometimes called "compliance voltage" since it is directly proportional to R, the effective total resistance across the output terminals. Thus, as the resistance R increases, the compliance voltage increases. If the load resistance increases, its terminal voltage increases. There have been found to be situations and conditions where it is desirable and important to limit the compliance voltage, for example, to protect the load from over-voltage conditions or to limit the output terminal voltage in case the load resistance is opened or removed from the circuit. It may also be necessary to make the voltage limit adjustable. In a precision current regulator it is important that the voltage limiter draw substantially no current though the sensing resistor so that the current regulation is not degraded.

In accordance with the present invention the voltage across output terminals 2 and 6 is compared with an adjustable reference voltage 19 at the input to a high input impedance amplifier 20 by means of leads 21, 22 and 23. The output of amplifier 20 is connected over lead 24 to the second input of OR gate 13. Amplifier 20 is phased so that if the voltage across output terminals 2 and 6 exceeds the preset voltage of reference 19 an overriding signal is applied to OR gate 13 and current control means 4 is caused to limit the current to the output terminals 2 and 6 to the value which just allows the output voltage to rise to a value which equals the voltage setting of reference 19.

In order to limit the voltage across the load terminals 15 and 16 to a predetermined value the limiting voltage at output terminals 2 and 6 must be higher by the load current drop in lead resistances 17 and 18. The effect of the lead resistances 17 and 18 may be overcome by connecting the voltage limiting circuit leads 21 and 22 directly to load terminals 15 and 16 as indicated by the dash lines 21' and 22'. By doing this a more precise maximum voltage setting may be made in cases where extremely close determination of the maximum voltage across the actual load resistance is to be made.

Figure 2:
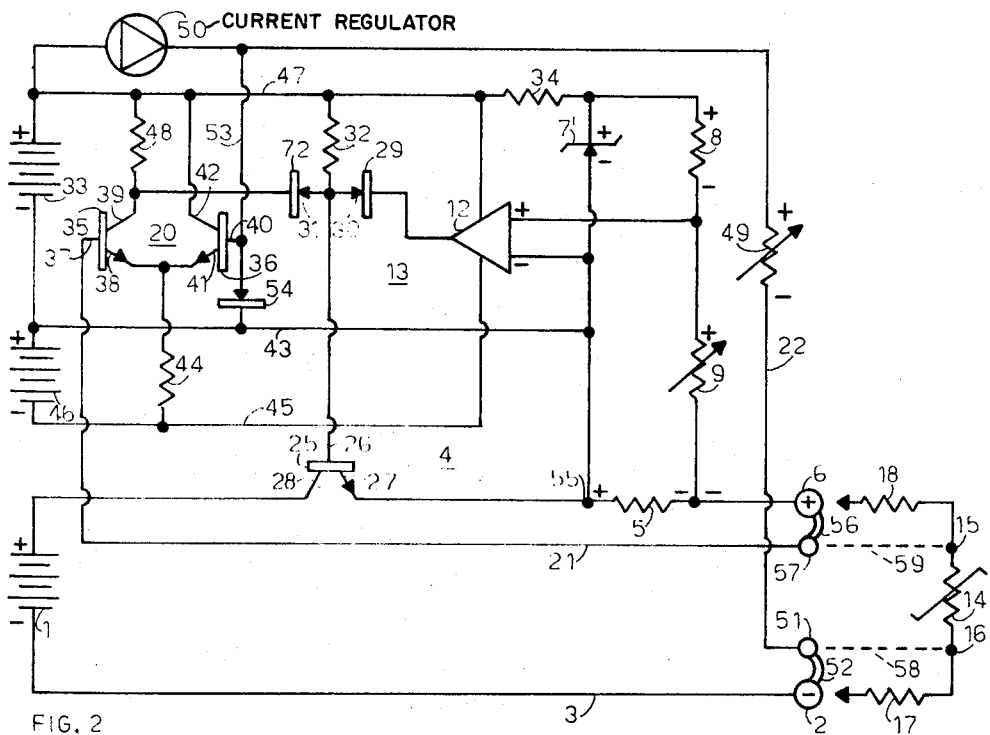
FIG. 2 is a simplified schematic circuit diagram of the present invention providing somewhat more detail than the circuit of FIG. 1.

FIG. 2 is similar to FIG. 1 with corresponding circuit elements carrying the same designation numbers but some portions of the circuit are shown in greater detail. In FIG. 2 the current control means 4 comprises transistor 25 having a base 26, an emitter 27 and a collector 28 and connected between voltage source 1 and current sensing resistor 5, collector 28 being connected to the voltage source 1 and emitter 27 being connected to current sensing resistor 5. OR gate 13 comprises diodes 29–30 and 72–31. With either diode forward biassed, forward current, as required, is supplied to base 26 through resistor 32 from a suitable source illustrated by battery 33. Excess current is by-passed by either diode forming an OR gate function as will be described in detail below.

The current control bridge circuit functions as set forth above. Here, however, the reference voltage is supplied by the regulated voltage across zener diode 7' receiving current from voltage source 33 through dropping resistor 34. Whenever the output current tends to rise above its preset level, amplifier 12 causes diode 29-30 to conduct more heavily. This shunts more current from base 26 causing transistor 25 to become less conducting. This in turn tends to lower the output current and bring it back to its preset level.

The over-voltage limiting circuit of FIG. 2 includes amplifier 20 comprising transistors 35 and 36 having bases 37 and 40, emitters 38 and 41 and collectors 39 and 42 respectively. These transistors are connected as a differential pair so that the one receiving the more positive base voltage is the more conducting one of the pair. Emitters 38 and 41 are connected together and returned through common resistor 44 to negative potential lead 45 maintained at a suitable negative voltage with respect to common return line 43 by a suitable voltage source represented by battery 46. Collector 42 is connected to positive lead 47 and collector 39 is connected to positive lead 47 through dropping resistor 48. Thus, if base 37 becomes more positive for any reason, than base 40, collector 39 draws current through resistor 48 thereby lowering its potential so that diode 72-31 is forward biassed and current is diverted from base 26, again decreasing the conductivity of transistor 25 and preventing the voltage on output terminal 6 from rising any further. This is the action produced in limiting the compliance voltage across the load resistor 14.

The potential of base 40 and hence the point at which the circuit provides voltage limiting to the load resistor is provided by the voltage drop across adjustable resistor 49 supplied with constant current by a current regulator 50 and returned over lead 22 to terminal 51 and over jumper 52 to output terminal 2. This voltage is applied to base 40 over lead 53. The reference voltage for the voltage limiting function is equal to the current supplied by current regulator 50 multiplied by the resistance of adjustable resistor 49. Thus, the over-voltage limiting point can be set by adjusting the resistance of adjustable resistor 49. Diode 54 is connected from base 40 to common line 43 to provide a path for current which is not drawn by resistor 49 as is the case when the circuit is operating far removed from the voltage limited condition. It is important to the present invention that no extraneous current i.e. currents other than the actual load current pass through the current sensing resistor 5. The above mentioned current through diode 54 is returned to common line 43 which connected to the input end of resistor 5 and hence does not pass through it. Also the current through reference resistor 49 is returned to this common line 43 from terminal 51, over lead 3, through voltage source 1 and transistor 25. Thus, the voltage limiting is accomplished without passing non-load current through the current sensing resistor which would degrade the current regulating function of the circuit.

With load resistor 14 connected through leads 17 and 18 to output terminals 2 and 6, the voltage across terminals 2 and 6 will be greater than the actual voltage across the load by the drop in the lead resistances 17 and 18 and hence the voltage limit must be set that much higher for a given load voltage limit as described above. The actual load voltage may be monitored by opening links 52 and 56 and connecting load terminal 15 to terminal 57 by means of lead 59 and connecting load terminal 16 to terminal 51 by means of lead 58. In this case the reference voltage provided across resistor 49 is set to the actual value of load voltage at which limiting is to take place without regard to load lead resistance.

Figure 3:
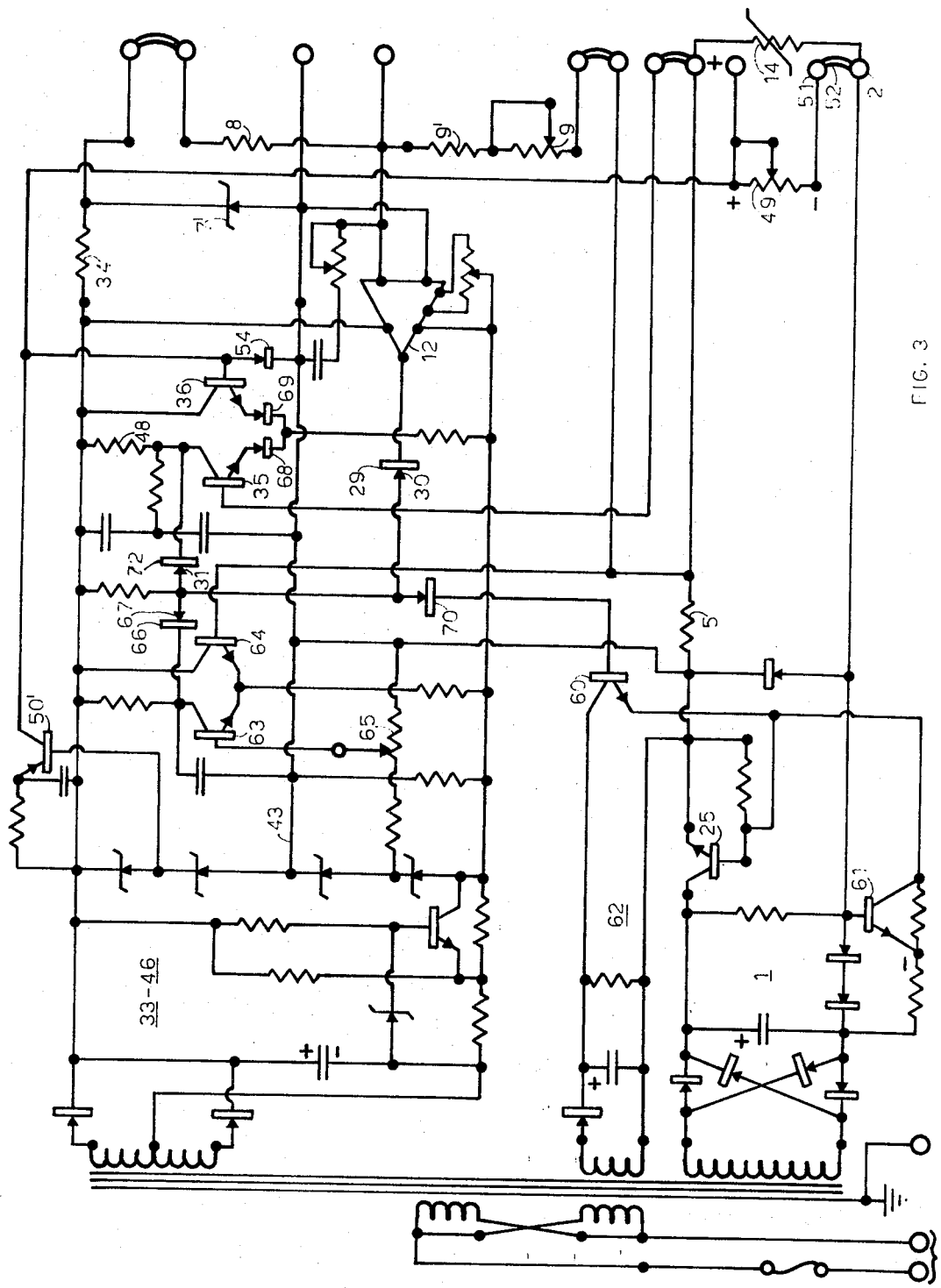
FIG. 3 is a detailed schematic circuit diagram of a current regulated power supply incorporating a voltage limiter in accordance with the present invention.

FIG. 3 is a complete schematic circuit diagram of the preferred form of the present invention. Corresponding components bear the same numerals as were applied in FIGS. 1 and 2. The battery voltage sources of FIGS. 1 and 2 have been replaced by line voltage rectifier-filter voltage sources 1, 33 and 46. A driver transistor 60 is connected between the OR gates 29-30, 72-31 and the base of control transistor 25. A constant current source provided by transistor 61 keeps transistor 25 in conduction under all operating conditions and provides a bleed current to transistor 60. Voltage for transistor 60 is provided by an auxiliary rectifier-filter voltage source 62. In addition an over-current limit is provided by transistor 63 and 64 which compare the voltage drop across current sensing resistor 5 with an adjustable portion of the voltage across potentiometer 65. This over-current circuit is OR gated to the base of transistor 60 by means of a third diode gate 66-67. Diodes 68 and 69 are provided in series with the emitters of transistors 35 and 36 respectively to block large reverse voltages which could otherwise put these transistor base-emitter diodes into zener conduction. Diode 70 is also provided in series with the base of transistor 60 to prevent reverse break-down voltages from being impressed between base and emitter of transistor 60. The constant current for the over-voltage control resistor 49 is supplied by transistor 50' connected as a constant current regulator.

I claim:
1. In a current regulated power supply, the combination of;
a source of unregulated voltage, a pass transistor, a current sensing resistor and a pair of load terminals connected in series;
a current control bridge and an OR gate connected between said current sensing resistor and said pass transistor for controlling the current delivered to said output terminals;
an over-voltage control means including an adjustable reference voltage source, means for comparing said reference voltage with the voltage across said load terminals coupled to said OR gate for overriding the current control bridge in response to voltage across said terminals in excess of said reference voltage;
and an additional over-current limiting means including a source of adjustable voltage, means for comparing the voltage drop across said current sensing resistor with said adjustable voltage and an additional OR gate connected between the latter said means and said pass transistor for controlling said transistor in response to voltage across said current sensing resistor in excess of said adjustable voltage.

* * * * *